United States Patent
Salgaonkar et al.

(10) Patent No.: US 10,294,406 B2
(45) Date of Patent: May 21, 2019

(54) SEALANT COMPOSITION FOR USE IN SUBTERRANEAN FORMATIONS

(71) Applicant: Halliburton Energy Services, Inc., Houston, TX (US)

(72) Inventors: Lalit Pandurang Salgaonkar, Pune (IN); Mallikarjuna Shroff Rama, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/544,228

(22) PCT Filed: Jan. 20, 2016

(86) PCT No.: PCT/US2016/014057
§ 371 (c)(1),
(2) Date: Jul. 17, 2017

(87) PCT Pub. No.: WO2016/137608
PCT Pub. Date: Sep. 1, 2016

(65) Prior Publication Data
US 2018/0010034 A1   Jan. 11, 2018

(30) Foreign Application Priority Data
Feb. 26, 2015   (IN) .............. 557/DEL/2015

(51) Int. Cl.
*E21B 33/138* (2006.01)
*C09K 8/512* (2006.01)
(Continued)

(52) U.S. Cl.
CPC ............. *C09K 8/512* (2013.01); *C08F 8/00* (2013.01); *C09K 8/508* (2013.01); *C09K 8/608* (2013.01); *C09K 8/88* (2013.01); *E21B 33/138* (2013.01)

(58) Field of Classification Search
CPC .......... C09K 8/512; C09K 8/508; C09K 8/88; C08F 8/00; E21B 33/138
(Continued)

(56) References Cited

U.S. PATENT DOCUMENTS

| 2,748,049 A | 5/1956 | Kalafus |
| 3,525,703 A | 8/1970 | Iwami et al. |

(Continued)

FOREIGN PATENT DOCUMENTS

| WO | 2001032752 | 5/2001 |
| WO | 2006112538 | 10/2006 |
| WO | 2009106987 | 9/2009 |

OTHER PUBLICATIONS

Indian Office Action for application No. 557DEL2015 dated Feb. 2, 2018.

(Continued)

*Primary Examiner* — Silvana C Runyan
(74) *Attorney, Agent, or Firm* — Thomas Rooney; C. Tumey Law Group PLLC

(57) ABSTRACT

Sealant compositions that may be used for creating fluid flow preventing barriers in a subterranean formation. A method may comprise reacting components comprising an oxazoline functionalized polymer and a crosslinking agent in a subterranean formation to create a barrier in the subterranean formation.

20 Claims, 2 Drawing Sheets

(51) Int. Cl.
*C09K 8/508* (2006.01)
*C09K 8/60* (2006.01)
*C09K 8/88* (2006.01)
*C08F 8/00* (2006.01)

(58) Field of Classification Search
USPC .......................................................... 166/292
See application file for complete search history.

(56) References Cited

U.S. PATENT DOCUMENTS

| | | |
|---|---|---|
| 4,460,029 A | 7/1984 | Schuetz et al. |
| 4,508,869 A | 4/1985 | Keskey et al. |
| 4,731,398 A * | 3/1988 | Huber ................. C09D 167/00 523/500 |
| 4,762,883 A | 8/1988 | Goel |
| 5,629,396 A | 5/1997 | Rice et al. |
| 5,922,797 A | 7/1999 | Chu et al. |
| 5,990,226 A | 11/1999 | Arita et al. |
| 6,084,023 A * | 7/2000 | Rasoul ................. C08F 257/02 524/530 |
| 6,703,077 B1 | 3/2004 | Chu et al. |
| 7,934,557 B2 | 5/2011 | Nguyen |
| 8,196,655 B2 | 6/2012 | Kalman et al. |
| 8,343,896 B2 | 1/2013 | Eoff et al. |
| 8,815,785 B2 | 8/2014 | Welton et al. |
| 2002/0125012 A1* | 9/2002 | Dawson ................. C09K 8/685 166/300 |
| 2008/0161208 A1 | 7/2008 | Beckman et al. |
| 2009/0133868 A1 | 5/2009 | Sullivan et al. |
| 2010/0069533 A1 | 3/2010 | Brady et al. |
| 2012/0247768 A1* | 10/2012 | Ballard ................. C09K 8/035 166/294 |
| 2013/0146312 A1 | 6/2013 | Gerard et al. |

OTHER PUBLICATIONS

International Search Report and Written Opinion for PCT/US2016/014057 dated Sep. 1, 2016.

* cited by examiner

SEALANT COMPOSITION FOR USE IN SUBTERRANEAN FORMATIONS

BACKGROUND

This invention relates to a sealant composition for use in subterranean formations and, in specific examples, sealant compositions that may be used for creating fluid flow preventing barriers in a subterranean formation.

When hydrocarbons are produced from wells that penetrate hydrocarbon producing formations, water often accompanies the hydrocarbons, particularly as the wells mature in time. The water can be the result of a water producing zone communicated with the hydrocarbon producing formations or zones by fractures, high permeability streaks and the like, or the water can be caused by a variety of other occurrences which are well known to those skilled in the art, such as water coning, water cresting, bottom water, channeling at the wellbore, etc. As used herein, the term "zone" simply refers to a portion of the formation and does not imply a particular geological strata or composition. Over the life of such wells, the ratio of water to hydrocarbons recovered may be undesirable in view of the cost of producing the water, separating it from the hydrocarbons, and disposing it, which can represent a significant economic loss.

A variety of techniques have been used to reduce the production of undesired water. Generally, these techniques involve the placement of a material in a wellbore penetrating a water-bearing portion of a subterranean formation that may prevent or control the flow of water into the wellbore. The techniques used to place these materials are referred to herein as "conformance techniques" or "conformance treatments." Some techniques involve the injection of particulates, foams, gels, sealants, or blocking polymers into the subterranean formation so as to plug off the water-bearing portions. For example, squeeze cementing techniques may be used wherein a cement slurry is forced with pressure into a void or channel through which water would otherwise flow into the wellbore, and the cement is allowed to set and seal off that channel. In other techniques, polymers referred to as "relative permeability modifiers" recently have been used, in some instances, to decrease the proportion of water with produced hydrocarbons.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
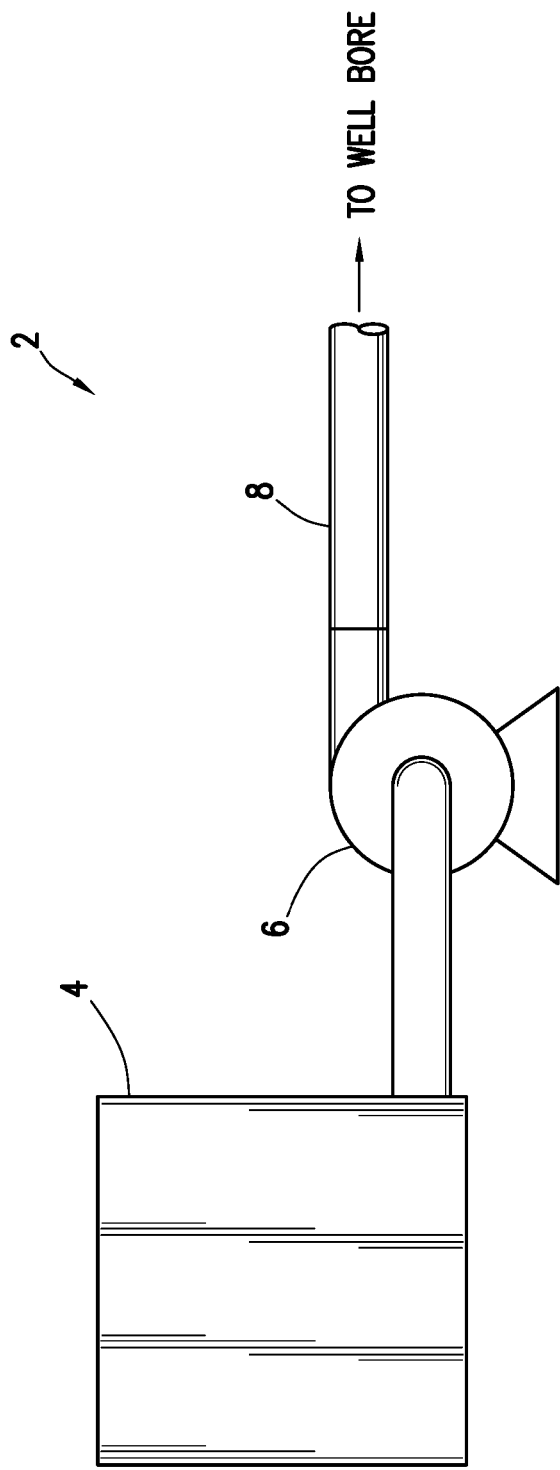
FIG. 1 is a schematic illustration of an example fluid handling system for the preparation and delivery of a sealant composition into a wellbore.

The present disclosure relates to treatment of subterranean formations and, in specific examples, sealant compositions that may be used for creating fluid flow preventing barriers in a subterranean formation.

Disclosed herein are sealant compositions that comprise an aqueous-base fluid, an oxazoline functionalized polymer, and a crosslinking agent. The sealant composition may be formed on the surface and introduced into the formation or, alternatively, the oxazoline functionalized polymer and the crosslinking agent may be introduced into the formation to form the sealant composition downhole. The oxazoline functionalized polymer contains oxazoline groups that crosslinks to form a gel network. The crosslinking agent contains groups that are reactive towards the oxazoline groups on the oxazoline functionalized polymer to form crosslinks. The crosslinking agent may thereby crosslink the oxazoline functionalized polymer to form the gel network. To delay the crosslinking reaction, the release of the groups reactive towards the oxazoline groups or functionality on the oxazoline functionalized polymer may be delayed, for example, through use of appropriate encapsulation techniques or by generation of the reactive groups downhole. The gel network may be formed in the subterranean formation to block certain flow paths in the subterranean formation, reducing the flow of fluids through the subterranean formation, especially the flow of aqueous fluids. Examples of the types of flow paths that may be blocked by the gel network include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow.

Of the many advantages of the various methods and compositions disclosed herein, one advantage may be that the sealant composition may be environmentally friendly allowing for use in locations that are subject to strict environmental regulations, such as the North Sea, Gulf of Mexico, etc. In contrast, many sealant compositions used heretofore are subject to strict environmental regulation and cannot be used in many areas of the world. Yet another advantage may be that only one sealant composition may need to be pumped downhole to create a fluid flow preventing barrier, as the crosslinking reaction may be controlled by delaying the release of the groups on the crosslinking agent that are reactive towards oxazoline functionality. Still another potential advantage may be that the crosslinking reaction should not generate any undesirable by product. Yet another potential advantage may be that the gel network formed downhole should be inert and stable for other chemical and geological stresses that may be presented after placement.

The oxazoline functionalized polymer may be a polymer that comprises an oxazoline group. Oxazolines are five-membered heterocyclic compounds that contain oxygen and nitrogen atoms and any derivative thereof. Various structural isomers of oxazoline are available, but typically the oxygen and nitrogen atoms are provided in the 1, 3 positions of the heterocycle, spaced apart by a single carbon atom.

A typical oxazoline group may have the following structure:

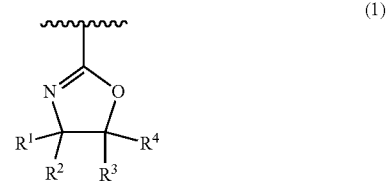

(1)

Wherein $R^1$, $R^2$, $R^3$, and $R^4$ independently denote a hydrogen atom, halogen atom, an alkyl group, an aralkyl group, a phenyl group, or a substitute phenyl group.

The oxazoline functionalized polymer may be a homopolymer or copolymer, which can be soluble in water or capable of forming a stable emulsion in water. The term copolymer polymer is intended to include polymers formed by linking two or more different monomers. Suitable oxazoline functionalized polymers may be prepared by polymerizing the corresponding oxazoline monomers. Suitable oxazoline functionalized polymer may also be prepared by functionalizing polymers that do not contain oxazoline groups, thereby attaching or forming oxazoline functional groups directly onto suitable polymer backbones. In addition, suitable oxazoline functionalized polymer may be extended by reacting them with polyacids, e.g. citric acid, or carboxylic acid functional polymers or oligomers. One example of a suitable oxazoline functionalized polymer is EPOCROS® oxazoline functionalized polymer, available from Nippon Shokubai.

Suitable oxazoline functionalized polymers may be formed by copolymerizing oxazoline-functional monomers such as isopropenyl oxazoline with another addition monomer to form an addition polymer. Suitable emulsion polymers may be made from ethylenically unsaturated oxazoline-functional monomers in the amount of from 10 to 100 weight percent, based on emulsion copolymer solids. Examples of oxazoline-functional monomers may include 2-isopropenyl 2-oxazoline and 2-vinyl 2-oxazoline. The addition monomer may be any polymerizable monomer that does not contain an oxazoline monomer. Suitable non-oxazoline containing addition monomers may include, for example, acrylates and vinyl monomers, such as styrene. The term "acrylate" is intended to acrylate or methacrylate monomers, including acids, esters, amides, and substituted derivatives thereof.

Examples of suitable oxazoline functionalized polymers may include, but are not limited to, homopolymers and copolymers, that have been functionalized with oxazoline groups. For example, oxazoline functionalized polymers may include, but are not limited to, homopolymers and copolymers, of one or more of acrylate, methacrylate, or vinyl monomers, such as styrene. Styrene monomers that may be used in the formation of the oxazoline functionalized polymer may include at least one of styrene, a substituted styrene, or any derivative thereof. A suitable oxazoline functionalized polymer may comprise polystyrene that has been functionalized with oxazoline groups. Acrylate monomers that may be used in the formation of the oxazoline functionalized polymer may include at least one of acrylate, methacrylate, ethylacrylate, propylacrylate, butylacrylate, tert-butyl-acrylate, n-hydroxyethyl methacrylate, potassium acrylate, pentabromobenzyl acrylate, methyl methacrylate, ethyl methacrylate, n-nitrophenyl acrylate, methyl 2-(acyloxymethyl)acrylate, cyclohexyl acrylate, n-ethylhexyl acrylate, or any derivative thereof.

An example of a suitable oxazoline functionalized polymer may have the following structure:

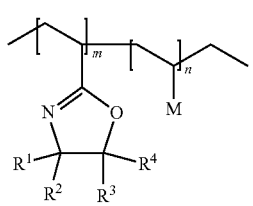

(2)

Wherein m is an integer from 2 to 1,000,000, n is an integer from 0 to 1,000,000, M is an organic pendant group, and $R^1$, $R^2$, $R^3$, and $R^4$ independently denote a hydrogen atom, halogen atom, an alkyl group, an aralkyl group, a phenyl group, or a substitute phenyl group.

The oxazoline functionalized polymer should be present to impart the desired gelation upon crosslinking. For example, the oxazoline functional polymer may be present in an amount in the range of from about 0.1% to about 80% by weight of the sealant composition, from about 10% to about 60% by weight of the sealant composition, or from about 30% to about 40% by weight of the sealant composition. For example, the oxazoline functional polymer may be present in an amount ranging between or including about 0.1%, 5%, 10%, 20%, 30%, 40%, 50%, 60%, 70%, or 80% by weight of the sealant composition. One of ordinary skill in the art, with the benefit of this disclosure, should be able to select an appropriate amount of the oxazoline functionalized polymer for a particular application.

The crosslinking agent may contain two or more groups that react with the oxazoline groups on the oxazoline functionalized to form crosslinks. The reactive groups may be any of a number of different reactive groups known to be reactive with oxazolines, including carboxylic groups, phenol groups, thiol groups, combinations thereof, or derivatives thereof. Aromatic phenolic groups may be present on the crosslinking agent in one example. Aromatic thiophenol groups may present on the crosslinking agent in another example. However, there is no limit on the type or amount of reactive groups that may be present on the crosslinking agents. Whenever bottomhole static temperatures are relatively lower, e.g., less than 100° F., aromatic compounds comprising two or more phenolic groups or thiophenolic groups may be used for crosslinking of the oxazoline functionalized polymer.

It may be desired to delay the release of the reactive groups in the crosslinking agent, for example, to delay the crosslinking reaction until placement of the sealant composition into the subterranean formation. The delayed release may be achieved by any suitable mechanism, including encapsulation of the crosslinking agent (e.g., by a wax or other material) or by using materials that release the reactive groups downhole. For example, materials may be used that should release carboxylic groups, such as esters or amides of carboxylic acids; release phenol groups, such as esters of phenolic acids; or release thiol groups. For release of carboxylic groups, esters may be used. Examples of suitable esters may include, but are not limited to, alkyl esters of dicarboxylic acids. Dicarboxylic acids can be saturated or unsaturated or aromatic dicarboxylic acids. Specific examples of suitable esters may include, but are not limited to, methyl or ethyl esters of saturated dicarboxylic acids such as oxalic, malonic, succinic, glutaric, adipic or pimelic acid etc., methyl or ethyl esters of unsaturated dicarboxylic acids such as maleic, fumaric or glutaconic acid etc., methyl or ethyl esters of aromatic dicarboxylic acids such as phthalic, isophthalic, terephthalic or diphenic acid etc. Aromatic thio esters that would release upon hydrolysis a thio group and a carboxylic acid group may also be suitable. Delaying the crosslinking reaction may be particularly desired where elevated bottom hole static temperatures may be present. For example, at bottom hole static temperature of 135° F. or greater, delayed release of the groups reactive to oxazoline functionality may be desired due to the increased reaction rates.

The crosslinking agent should be present to provide the desired crosslinking of the oxazoline functional polymer.

For example, the crosslinking agent may be present in an amount in the range of from about 0.1% to about 50% by weight of the sealant composition, from about 1% to about 10% by weight of the sealant composition, or from about 1.5% to about 5% by weight of the sealant composition. In some examples, the crosslinking agent may be present in an amount ranging between or including about 0.1%, about 5%, about 10%, about 20%, about 30%, about 40%, or about 50% by weight of the sealant composition. One of ordinary skill in the art, with the benefit of this disclosure, should be able to select an appropriate amount of the crosslinking agent for a particular application.

The ratios of the oxazoline crosslinking agent and the oxazoline functional polymer may vary, depending on a number of factors including the structure of the oxazoline crosslinking agent and oxazoline function polymer, downhole conditions, and desired properties of the gel network, among others. For example, the molar ratio of oxazoline functional groups in the oxazoline functional polymer to reactive groups in the crosslinking agent may vary from a range of about 1000:1 to about 1:2 or from about 1000:1 to about 1:1, or from about 50:1 to about 1:1 or from about 25:1 to about 1:1 or from about 1.5:1 to about 1:1.

As previously mentioned, the groups on the crosslinking agent should react with the oxazoline groups on the oxazoline functionalized polymer to form crosslinks. The extent of the reaction may be adjusted by controlling a number of factors, including, without limitation, the number of oxazoline functional groups, crosslinker concentration, polymer concentration, and crosslinker type, among others. The reaction mechanism for crosslinking an oxazoline functionalized polymer by a dicarboxylic acid is provided by equations (3) to (4) below. Equation (3) shows the hydrolysis of a diester to release a dicarboxylic acid in situ. Equation (4) shows the ring opening polymerization of two oxazoline rings with a dicarboxlic acid.

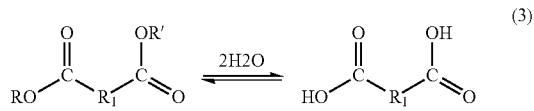

Hydrolysis of a Diester Releases In-situ a Dicarboxylic Acid

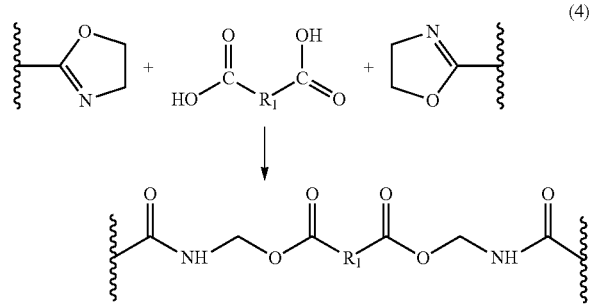

Ring Opening Polymerization of Two Oxazoline Rings with a Dicarboxylic Acid

Equations (5) and (6) below show reactions of phenols and thiophenols with oxazoline groups, respectively:

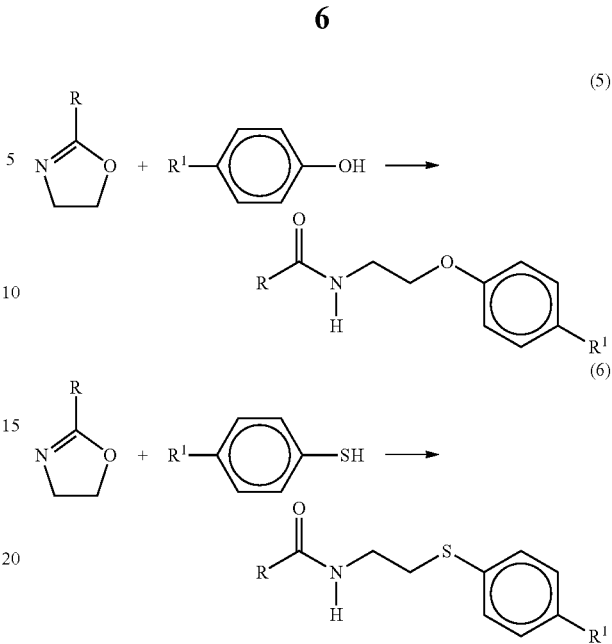

Aqueous base fluids that may be suitable for use in the disclosed methods may comprise fresh water, saltwater (e.g., water containing one or more salts dissolved therein), brine, seawater, or combinations thereof. Generally, the water may be from any source, provided that it does not contain components that might undesirably affect the stability and/or performance of the treatment fluids of the present invention. If desired, the density of the aqueous base fluid can be adjusted, among other purposes, to provide additional particle transport and suspension in the sealant compositions. If desired, the pH of the aqueous base fluid may be adjusted (e.g., by a buffer or other pH adjusting agent), among other purposes, to facilitate crosslinking and/or reduce the viscosity of the sealant composition (e.g., activate a breaker or other additive). The pH may be adjusted to a specific level, which may depend on, among other factors, the type(s) of particular components included in the treatment fluid. One of ordinary skill in the art, with the benefit of this disclosure, will recognize when such density and/or pH adjustments are appropriate.

The sealant compositions optionally may comprise any number of additional additives, including, but not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, should recognize the types of additives that may be included in the sealant compositions for a particular application.

As will be appreciated by those of ordinary skill in the art, the sealant composition may be used in a variety of subterranean operations, where formation of a fluid diverting (or flow preventing) barrier may be desired, such as conformation treatments and lost circulation control, among others. The sealant composition may be used prior to, during, or subsequent to a variety of subterranean operations. Methods of using the sealant compositions may first include preparing the sealant compositions. The sealant compositions may be prepared in any suitable manner, for example, by combining the oxazoline crosslinking agent, the oxazoline functional polymer, and the aqueous base fluid in any suitable order. The sealant composition may be used as a single step treatment in which the oxazoline crosslinking agent and the oxazoline functional polymer, are premixed with the aqueous base fluid and then introduced into the subterranean formation for crosslinking. It may be desired to form the sealant composition immediately prior to use to prevent premature gelation before reaching the desired location in the subterranean formation. Alternatively, the sealant composition may be used as a multi-step treatment in which the oxazoline crosslinking agent and the oxazoline functional polymer may be separately introduced into the subterranean formation for crosslinking. For example, the oxazoline functional polymer may be mixed with an aqueous base fluid and placed into the subterranean formation where it may be contacted with an oxazoline crosslinking agent, which may already be present in the formation or subsequently introduced.

Methods may include introduction of the sealant composition into a subterranean formation. In the subterranean formation, the sealant composition may undergo a crosslinking reaction to form a gel network that blocks certain flow paths therein, reducing the flow of fluids through the subterranean formation, especially the flow of aqueous fluids. Examples of the types of flow paths that may be blocked by the gel network include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow. Methods may further include selecting one or more zones of the subterranean formation for conformance control in which the sealant composition may be introduced.

A method may comprise reacting components comprising an oxazoline functional polymer and a crosslinking agent in a subterranean formation to create a barrier in the subterranean formation. The oxazoline functionalized polymer may be a polymer with one or more oxazoline functional groups attached to the polymer backbone. The oxazoline functionalized polymer may be a copolymer of an oxazoline monomer and an addition monomer that does not contain an oxazoline functional group. The oxazoline functionalized polymer comprises a copolymer of one or more monomers selected from the group consisting of acrylate, methacrylate, and a styrene monomer. The crosslinking agent may comprise reactive groups selected from the group consisting of a carboxylic group, phenol group, thiol group, a combination thereof, and a derivative thereof. The crosslinking agent may comprise reactive groups that are delayed release such that step of reacting is delayed until release of the reactive groups. The method may further comprise introducing a sealant composition comprising an aqueous-base fluid, the oxazoline functionalized polymer and the crosslinking agent into the subterranean formation. The crosslinking agent may comprise an ester or amide of a carboxylic acid that hydrolyzes to release groups reactive to oxazoline functionality. The crosslinking agent may comprise an ester of at least one carboxylic acid selected from the group consisting of oxalic acid, malonic acid, succinic acid, glutaric acid, adipic acid, pimelic acid, maleic acid, fumaric acid, glutaconic acid, phthalic acid, isophthalic acid, terephthalic acid, and diphenic acid. The oxazoline functionalized polymer may present in the sealant composition in an amount of about 0.1% to about 80% by weight of the sealant composition. The molar ratio of oxazoline functional groups in the oxazoline functional polymer to reactive groups in the crosslinking agent may be in a range of from about 1000:1 to about 1:2.

A sealant composition may comprise an aqueous-base fluid; an oxazoline functionalized polymer; and a crosslinking agent. The oxazoline functionalized polymer may be a polymer with one or more oxazoline functional groups attached to the polymer backbone. The oxazoline functionalized polymer may be a copolymer of an oxazoline monomer and an addition monomer that does not contain an oxazoline functional group. The oxazoline functionalized polymer comprises a copolymer of one or more monomers selected from the group consisting of acrylate, methacrylate, and a styrene monomer. The crosslinking agent may comprise reactive groups selected from the group consisting of a carboxylic group, phenol group, thiol group, a combination thereof, and a derivative thereof. The crosslinking agent may comprise reactive groups that are delayed release such that step of reacting is delayed until release of the reactive groups. The crosslinking agent may comprise an ester or amide of a carboxylic acid that hydrolyzes to release groups reactive to oxazoline functionality. The crosslinking agent may comprise an ester of at least one carboxylic acid selected from the group consisting of oxalic acid, malonic acid, succinic acid, glutaric acid, adipic acid, pimelic acid, maleic acid, fumaric acid, glutaconic acid, phthalic acid, isophthalic acid, terephthalic acid, and diphenic acid. The oxazoline functionalized polymer may present in the sealant composition in an amount of about 0.1% to about 80% by weight of the sealant composition. The molar ratio of oxazoline functional groups in the oxazoline functional polymer to reactive groups in the crosslinking agent may be in a range of from about 1000:1 to about 1:2.

A well system may comprise a sealant composition comprising an aqueous-base fluid, an oxazoline functionalized polymer, and a crosslinking agent; a fluid handling system comprising the sealant composition; and a conduit in fluidically coupled to the fluid handling system and a wellbore. The fluid handling system may comprise a fluid supply and pumping equipment. The oxazoline functionalized polymer may be a polymer with one or more oxazoline functional groups attached to the polymer backbone. The oxazoline functionalized polymer may be a copolymer of an oxazoline monomer and an addition monomer that does not contain an oxazoline functional group. The oxazoline functionalized polymer comprises a copolymer of one or more monomers selected from the group consisting of acrylate, methacrylate, and a styrene monomer. The crosslinking agent may comprise reactive groups selected from the group consisting of a carboxylic group, phenol group, thiol group, a combination thereof, and a derivative thereof. The crosslinking agent may comprise reactive groups that are delayed release such that step of reacting is delayed until release of the reactive groups. The crosslinking agent may comprise an ester or amide of a carboxylic acid that hydrolyzes to release groups reactive to oxazoline functionality. The crosslinking agent may comprise an ester of at least one carboxylic acid selected from the group consisting of oxalic acid, malonic acid, succinic acid, glutaric acid, adipic acid, pimelic acid, maleic acid, fumaric acid, glutaconic acid, phthalic acid, isophthalic acid, terephthalic acid, and diphenic acid. The oxazoline functionalized polymer may present in the sealant composition in an amount of about 0.1% to about 80% by weight of the sealant composition. The molar ratio of oxazoline functional groups in the oxazoline functional polymer to reactive groups in the crosslinking agent may be in a range of from about 1000:1 to about 1:2.

Example methods of using the sealant compositions will now be described in more detail with reference to FIGS. 1 and 2. Any of the previous embodiments of the sealant composition may apply in the context of FIGS. 1 and 2. Referring now to FIG. 1, a fluid handling system 2 is illustrated. The fluid handling system 2 may be used for preparing the sealant composition and introduction of the sealant composition into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, which both may be fluidically coupled with a wellbore supply conduit 8. The fluid supply 4 may contain the sealant composition. The pumping equipment 6 may be used to supply the sealant composition from the fluid supply 4, which may include tank, reservoir, connections to external fluid supplies, and/or other suitable structures and equipment. While not illustrated, the fluid supply 4 may contain one or more components of the sealant composition in separate tanks or other containers that may be mixed at any desired time. Pumping equipment 6 may be fluidically coupled with the wellbore supply conduit 8 to communicate the sealant composition into wellbore. Fluid handling system 2 may also include surface and down-hole sensors (not shown) to measure pressure, rate, temperature and/or other parameters of treatment. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel deployed or may be comprised of sub-sea deployed equipment.

Figure 2:
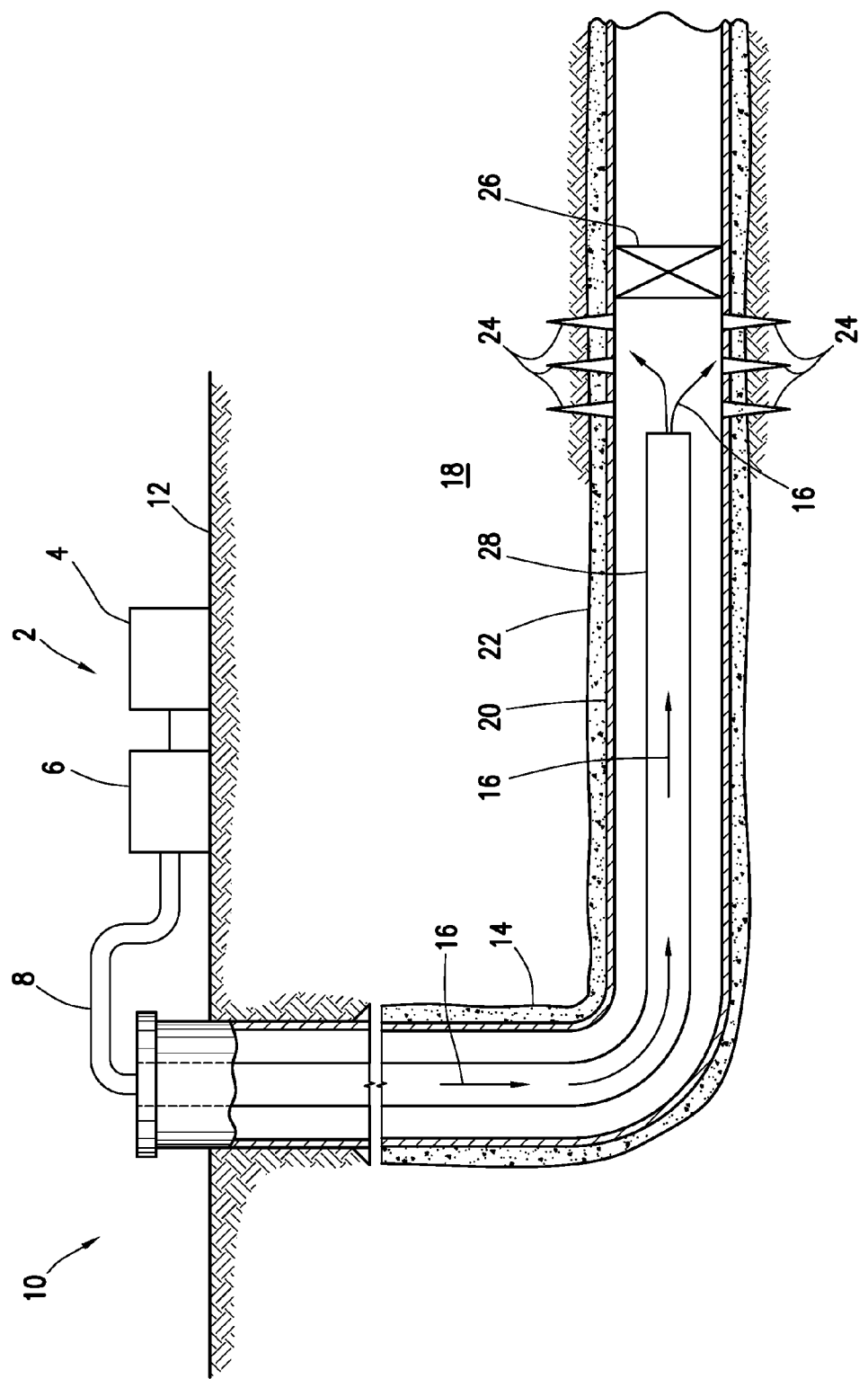
FIG. 2 is a schematic illustration of example well system showing placement of a sealant composition into a wellbore.

Turning now to FIG. 2, an example well system 10 is shown. As illustrated, the well system 10 may include a fluid handling system 2, which may include fluid supply 4, pumping equipment 6, and wellbore supply conduit 8. As previously described in connection with FIG. 1, pumping equipment 6 may be fluidically coupled with the wellbore supply conduit 8 to communicate the sealant composition into wellbore. As depicted in FIG. 2, the fluid supply 4 and pumping equipment 6 may be above the surface 12 while the wellbore 14 is below the surface. Well system 10 can be configured as shown in FIG. 2 or in a different manner, and may include additional or different features as appropriate.

As illustrated FIG. 2, the well system 10 may be used for introduction of a sealant composition 16 into subterranean formation 18 surrounding the wellbore 14. Generally, a wellbore 14 may include horizontal, vertical, slanted, curved, and other types of wellbore geometries and orientations, and the sealant composition 16 may generally be applied to subterranean formation 18 surrounding any portion of wellbore 14. As illustrated, the wellbore 14 may include a casing 20 that may be cemented (or otherwise secured) to wellbore wall by cement sheath 22. Perforations 24 can be formed in the casing 20 and cement sheath 22 to allow treatment fluids (e.g., sealant composition 16) and/or other materials to flow into and out of the subterranean formation 18. Perforations 24 can be formed using shape charges, a perforating gun, and/or other tools. A plug 26, which may be any type of plug (e.g., bridge plug, etc.) may be disposed in wellbore 14 below the perforations 24.

The sealant composition 16 comprising an aqueous-base fluid, an oxazoline functionalized polymer, and a crosslinking agent may be pumped from fluid supply 4 down the interior of casing 20 in wellbore 14. As illustrated, well conduit 28 (e.g., coiled tubing, drill pipe, etc.) may be disposed in casing 20 through which the sealant composition 16 may be pumped. The well conduit 28 may be the same or different than the wellbore supply conduit 8. For example, the well conduit 28 may be an extension of the wellbore supply conduit 8 into the wellbore 14 or may be tubing or other conduit that is coupled to the wellbore supply conduit 8. The sealant composition 16 may be allowed to flow down the interior of well conduit 28, exit the wellbore conduit, and finally enter subterranean formation 18 surrounding wellbore 14 by way of perforations 24 through the casing 20 and cement sheath 24. The sealant composition 16 may undergo a crosslinking reaction in the subterranean formation 18 to form a gel network that blocks certain flow paths therein, reducing the flow of fluids through the subterranean formation 18, especially the flow of aqueous fluids.

The exemplary sealant composition disclosed herein may directly or indirectly affect one or more components or pieces of equipment associated with the preparation, delivery, recapture, recycling, reuse, and/or disposal of the sealant composition. For example, the sealant composition may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The sealant composition may also directly or indirectly affect any transport or delivery equipment used to convey the sealant composition to a well site or downhole such as, for example, any transport vessels, conduits, pipelines, trucks, tubulars, and/or pipes used to compositionally move the sealant composition from one location to another, any pumps, compressors, or motors (e.g., topside or downhole) used to drive the sealant composition into motion, any valves or related joints used to regulate the pressure or flow rate of the resin composition and spacer fluids (or fluids containing the same sealant composition, and any sensors (i.e., pressure and temperature), gauges, and/or combinations thereof, and the like. The disclosed sealant composition may also directly or indirectly affect the various downhole equipment and tools that may come into contact with the sealant composition such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

A sealant composition was prepared by mixing 100 milliliters of an aqueous dispersion of an oxazoline functionalized polymer (40 wt % active) with three milliliters of diethyl malonate. The mixture was placed in a glass vial and exposed to 167° F. (75° C.) for sixteen hours in an autoclave at 200 psi pressure to trigger curing. The cured sample formed a rigid block that took the shape of the glass vial. In comparison, the uncured sample was very fluid and easy to flow.

Example 2

Water shutoff testing was next performed using the sealant composition of Example 1. A sand pack test cell was prepared that comprised 100 mesh sand (75 grams), U.S. sieve series, with a layer of 20/40 mesh sand (35 grams) on top to allow flow to be uniformly distributed within the 100 mesh sand. The sand pack had a length of 12.5 centimeters and a diameter of 2.56 centimeters.

The initial permeability of the sand pack was first determined by pumping a 3% KCl brine into the test cell at a flow rate of 2 milliliters per minute until a constant differential pressure was obtained. The initial permeability (Ki) of the sand pack was calculated by means of Darcy's law. Next, the sand pack was flooded with the sealant composition by pumping the sealant composition into the sand pack at a rate of 2 milliliters per minute while monitoring the differential pressure. After two pore volumes of the sealant composition were run through the sand pack, the sand pack test cell was shut in for curing at 167° F. (75° C.) for 16 hours. A jacket heater was used for heating the test cell.

Since the sealant composition is proposed for conformance applications, it was desired to tests the cured sand pack to the flow of fluids under increasing differential pressures ($\Delta P$). After the shut-in, the sand pack test cell was configured, for pressure testing. During the pressure testing, a particular $\Delta P$ was maintained across the sand pack, and the sand pack was observed for any leakage while applying 3% KCl, which would be indicated by a drop of the applied $\Delta P$ for about 5 minutes. Once the applicability of the sand pack to resist a particular $\Delta P$ was established, the $\Delta P$ across the sand pack was increased to the next level. This was continued until leakage was observed. The percent permeability reduction (PPR) was evaluated as well.

The table below shows the data generated from the water shutoff testing.

TABLE 1

Sealant Composition: Aqueous Solution of Oxazoline Functionalized Polymer + Diethyl Malonate 3% (v/v) wrt the Polymer
Curing: 16 hours at 167° F. (75° C.)
Sand Pack: Length = 12.5 cm; Diameter = 2.56 cm

| Leak Rate, Q (ml/min) | Differential Pressure, $\Delta P$ (psi) | Final Permeability, Kf (mD) | PPR = 100 (1 − Kf/Ki) | Comment |
|---|---|---|---|---|
| 0 | 50 | 0 | 100% | No Leak |
| 0 | 100 | 0 | 100% | No Leak |
| 0 | 200 | 0 | 100% | No Leak |
| 0 | 300 | 0 | 100% | No Leak |
| 0 | 400 | 0 | 100% | No Leak |
| 0 | 600 | 0 | 100% | No Leak |
| 0 | 700 | 0 | 100% | No Leak |
| 0 | 800 | 0 | 100% | No Leak |
| 0 | 900 | 0 | 100% | No Leak |
| 0.7 | 1000 | 0.27 | 99.99% | Small Leakage |

The above results indicate the oxazoline functionalized polymers can be used for formation of barriers that can reduce or stop fluid flow. To evaluate the extent of curing the unconfined compressive strength of the cured sand pack was determined. The cured sand pack was cut in half and the top and bottom portions were separately evaluated. The compressive strength was determined by separately crushing the top and bottom portions in a compression-testing machine. The compressive strength is calculated from the failure load divided by the cross-sectional area resisting the load and is reported in units of pound-force per square inch (psi). Compressive strengths may be determined in accordance with API RP 10B-2, Recommended Practice for Testing Well Cements, First Edition, July 2005. The top portion of the cured sand pack had a compressive strength of 365 psi, and the bottom portion of the cured sand pack had a compressive strength of 190 psi.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed:

1. A method comprising:
   introducing an oxazoline functionalized polymer into a subterranean formation, wherein the oxazoline functionalized polymer comprises oxazoline groups;
   introducing a crosslinking agent into the subterranean formation, wherein the crosslinking agent comprises reactive groups that are reactive with the oxazoline groups;
   reacting the oxazoline functionalized polymer and the crosslinking agent in the subterranean formation to crosslink the oxazoline groups and create a barrier in the subterranean formation.

2. The method of claim 1 wherein the oxazoline functionalized polymer is a polymer comprising a polymer backbone with the one or more oxazoline functional groups attached to the polymer backbone.

3. The method of claim 1 wherein the oxazoline functionalized polymer is a copolymer of an oxazoline monomer and an addition monomer that does not contain an oxazoline functional group.

4. The method of claim 1 wherein the oxazoline functionalized polymer comprises a copolymer of one or more monomers selected from the group consisting of acrylate, methacrylate, and a styrene monomer.

5. The method of claim 1 wherein the reactive groups of the crosslinking agent are selected from the group consisting of a carboxylic group, phenol group, thiol group, a combination thereof, and a derivative thereof.

6. The method of claim 1 wherein the reactive groups of the crosslinking agent are delayed release such that step of reacting is delayed until release of the reactive groups.

7. The method of claim 1 further wherein the oxazoline functional polymer and the crosslinking agent are both introduced into the subterranean formation in a sealant composition comprising an aqueous-base fluid, the oxazoline functionalized polymer and the crosslinking agent.

8. The method of claim 7 wherein crosslinking agent comprises an ester or amide of a carboxylic acid that hydrolyzes to release groups reactive to oxazoline functionality.

9. The method of claim 7 wherein the crosslinking agent comprises an ester of at least one carboxylic acid selected from the group consisting of oxalic acid, malonic acid, succinic acid, glutaric acid, adipic acid, pimelic acid, maleic acid, fumaric acid, glutaconic acid, phthalic acid, isophthalic acid, terephthalic acid, and diphenic acid.

10. The method of claim 7, wherein the oxazoline functionalized polymer is present in the sealant composition in an amount of about 0.1% to about 80% by weight of the sealant composition, and wherein the molar ratio of oxazoline functional groups in the oxazoline functional polymer to reactive groups in the crosslinking agent is in a range of from about 1000:1 to about 1:2.

11. A well system comprising:
    a sealant composition comprising an aqueous-base fluid, an oxazoline functionalized polymer, and a crosslinking agent, wherein the oxazoline functionalized polymer comprises oxazoline groups, wherein the crosslinking agent comprises reactive groups that are reactive with the oxazoline groups;
    a fluid handling system comprising the sealant composition; and
    a conduit in fluidically coupled to the fluid handling system and a wellbore.

12. The system of claim 11 wherein the fluid handling system comprises a fluid supply and pumping equipment.

13. The system of claim 11 wherein crosslinking agent comprises an ester or amide of a carboxylic acid that hydrolyzes to release groups reactive to oxazoline functionality.

14. The system of claim 11 wherein the wherein the oxazoline functionalized polymer has the following structure:

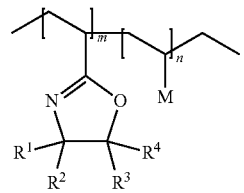

wherein m is an integer from 2 to 1,000,000, n is an integer from 0 to 1,000,000, M is an organic pendant group, and $R^1$, $R^2$, $R^3$, and $R^4$ independently denote a hydrogen atom, halogen atom, an alkyl group, an aralkyl group, a phenyl group, or a substituted phenyl group.

15. A method comprising:
    introducing an oxazoline functionalized polymer into a subterranean formation, wherein the oxazoline functionalized polymer has the following structure:

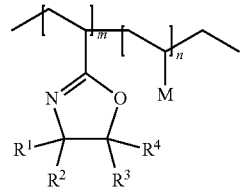

wherein m is an integer from 2 to 1,000,000, n is an integer from 0 to 1,000,000, M is an organic pendant group, and $R^1$, $R^2$, $R^3$, and $R^4$ independently denote a hydrogen atom, halogen atom, an alkyl group, an aralkyl group, a phenyl group, or a substitute phenyl group;
    introducing a crosslinking agent into the subterranean formation;
    reacting the oxazoline functionalized polymer and the crosslinking agent in the subterranean formation to crosslink the oxazoline functionalized polymer and create a barrier in the subterranean formation.

16. The method of claim 15 wherein the crosslinking agent comprises reactive groups selected from the group consisting of a carboxylic group, phenol group, thiol group, derivatives thereof, and combinations thereof.

17. The method of claim 15 wherein the crosslinking agent comprises reactive groups that are delayed release such that step of reacting is delayed until release of the reactive groups.

18. The method of claim 15 wherein the oxazoline functional polymer and the crosslinking agent are both introduced into the subterranean formation in a sealant composition comprising an aqueous-base fluid, the oxazoline functionalized polymer and the crosslinking agent.

19. The method of claim 18 wherein crosslinking agent comprises an ester or amide of a carboxylic acid that hydrolyzes to release groups reactive to oxazoline functionality.

20. The method of claim 18, wherein the oxazoline functionalized polymer is present in the sealant composition in an amount of about 0.1% to about 80% by weight of the sealant composition, and wherein a molar ratio of oxazoline functional groups in the oxazoline functional polymer to reactive groups in the crosslinking agent is in a range of from about 1000:1 to about 1:2.

* * * * *